United States Patent
Jin et al.

(10) Patent No.: US 12,407,172 B2
(45) Date of Patent: Sep. 2, 2025

(54) CURRENT SOURCE RESPONSE METHOD AND APPARATUS, AND COMPUTER-READABLE STORAGE MEDIUM

(71) Applicant: ALTENERGY POWER SYSTEM INC., Zhejiang (CN)

(72) Inventors: Kaifeng Jin, Zhejiang (CN); Dongming Zhou, Zhejiang (CN); Yuhao Luo, Zhejiang (CN)

(73) Assignee: ALTENERGY POWER SYSTEM INC., Zhejiang (CN)

( * ) Notice: Subject to any disclaimer, the term of this patent is extended or adjusted under 35 U.S.C. 154(b) by 0 days.

(21) Appl. No.: 18/699,309

(22) PCT Filed: Feb. 23, 2022

(86) PCT No.: PCT/CN2022/077365
§ 371 (c)(1),
(2) Date: Apr. 8, 2024

(87) PCT Pub. No.: WO2023/123641
PCT Pub. Date: Jul. 6, 2023

(65) Prior Publication Data
US 2024/0405570 A1 Dec. 5, 2024

(30) Foreign Application Priority Data
Dec. 28, 2021 (CN) .......................... 202111632528.7

(51) Int. Cl.
*H02J 3/46* (2006.01)
(52) U.S. Cl.
CPC ...................................... *H02J 3/46* (2013.01)
(58) Field of Classification Search
CPC ............. H02J 3/46; H02J 3/38; H02J 2300/22
See application file for complete search history.

(56) References Cited

U.S. PATENT DOCUMENTS

| | | | |
|---|---|---|---|
| 12,003,105 B2 * | 6/2024 | Xiang | ..................... H02J 3/381 |
| 2023/0078602 A1 | 3/2023 | Fang et al. | |
| 2023/0135970 A1 | 5/2023 | Li et al. | |

FOREIGN PATENT DOCUMENTS

| | | |
|---|---|---|
| CN | 202889244 U | 4/2013 |
| CN | 103208816 A | 7/2013 |

(Continued)

OTHER PUBLICATIONS

International Search Report for PCT/CN2022/077365 mailed Sep. 28, 2022, ISA/CN.

(Continued)

*Primary Examiner* — Carlos Amaya
(74) *Attorney, Agent, or Firm* — Yue (Robert) Xu; Apex Attorneys at Law, LLP (57) ABSTRACT

A method and a device for a current source to respond, and a computer-readable storage medium are provided. Parallel control for the current source and a voltage source is established, and a voltage across an alternating-current bus is acquired. When the voltage is lower than a first threshold, the current source outputs a current to increase the voltage across the alternating-current bus. Then, it is determined whether the voltage exceeds a second threshold. When the voltage exceeds the second threshold, the current source stops outputting the current. When the voltage does not exceed the second threshold, power is distributed between the current source and the voltage source after power synchronization. The current source directly outputs the current, and therefore unnecessarily wait for the power from the voltage source.

11 Claims, 5 Drawing Sheets

(56) References Cited

FOREIGN PATENT DOCUMENTS

| | | | |
|---|---|---|---|
| CN | 104810848 | A | 7/2015 |
| CN | 108933436 | A | 12/2018 |
| CN | 109861271 | A | 6/2019 |
| CN | 109962448 | A | 7/2019 |
| CN | 111864781 | A | 10/2020 |
| CN | 112332449 | A | 2/2021 |
| CN | 112865165 | A | 5/2021 |
| CN | 112952909 | A | 6/2021 |
| WO | 2021238889 | A1 | 12/2021 |

OTHER PUBLICATIONS

Chinese First Office Action issued on Jan. 9, 2025 for the Chinese priority application No. 202111632528.7.

\* cited by examiner

CURRENT SOURCE RESPONSE METHOD AND APPARATUS, AND COMPUTER-READABLE STORAGE MEDIUM

The present application is a national phase application of PCT international patent application No. PCT/CN2022/077365, filed on Feb. 23, 2022 which claims priority to Chinese Patent Application No. 202111632528.7, titled "METHOD AND DEVICE FOR CURRENT SOURCE TO RESPOND, AND COMPUTER-READABLE STORAGE MEDIUM", filed on Dec. 28, 2021 with the China National Intellectual Property Administration, all of which are incorporated herein by reference in their entireties.

FIELD

The present application relates to the field of power technology, and in particular to a method and a device for a current source to respond, and a computer-readable storage medium.

BACKGROUND

For renewables, e.g., solar energy, wind energy, inverters convert generated direct-current power into alternating-current power. Off-grid inverters are used in places where the power grid cannot reach. The off-grid inverters generally function as voltage sources, and therefore are stand-alone inverters. Multiple off-grid inverters operate in parallel to form a system of large and variable capacity. In a conventional master-slave system, an on-grid slave inverter performs power regulation though loop power control or loop current control. The master inverter transmits the calculated power to the slave inverter through a communication line. The slave inverter regulates its output current through loop power control, for evenly distributing power.

However, in the process of distributing power according to the conventional technology, the slave inverter is relatively slow to respond, exerting great pressure on the master inverter. This may damage the master inverter.

Therefore, how to speed up the response by the slave inverter is a problem to be urgently solved by those skilled in the art.

SUMMARY

According to the present disclosure, a method and a device for a current source to respond, and a computer-readable storage medium are provided.

To solve the above technical problems, the method according to the present disclosure includes: establishing parallel control for the current source and a voltage source; acquiring a voltage across an alternating-current bus; controlling the current source to output a current when the voltage is lower than a first threshold; determining whether the voltage exceeds a second threshold, wherein the second threshold is greater than the first threshold; controlling the current source to stop outputting the current, when the voltage exceeds the second threshold; and distributing power between the current source and the voltage source after power synchronization, when the voltage does not exceed the second threshold.

Preferably, the distributing power between the current source and the voltage source includes: evenly distributing the power between the current source and the voltage source; or distributing the power between the current source and the voltage source based on remaining battery corresponding to the current source and remaining battery corresponding to the voltage source.

Preferably, the method further includes: in response to a sudden decrease in the power, acquiring a change in the voltage across the alternating-current bus; determining whether the change is within a preset range; controlling the current source to output the current when the change is within the preset range; and controlling the current source to output electrical energy to the voltage source for the voltage source to output the electrical energy to a battery.

Preferably, the controlling the current source to output electrical energy to the voltage source for the voltage source to output the electrical energy to a battery is performed when the change is not within the preset range.

Preferably, the method further includes: monitoring a state of the voltage source and a state of the current source.

To solve the above technical problems, the device includes: an establishing module, an acquiring module, a first controlling module, a determining module, a second controlling module, and a distributing module. The establishing module is configured to establish parallel control for the current source and a voltage source. The acquiring module is configured to acquire a voltage across an alternating-current bus. the first controlling module is configured to control the current source to output a current when the voltage is lower than a first threshold. The determining module is configured to: determine whether the voltage exceeds a second threshold, where the second threshold is greater than the first threshold; trigger the second controlling module when the voltage exceeds the second threshold; and trigger the distribution module when the voltage does not exceed the second threshold. The second controlling module is configured to control the current source to stop outputting the current. The distributing module is configured to distribute power between the current source and the voltage source after power synchronization.

To solve the above technical problems, the device includes a memory and a processor. The memory stores a computer program. The processor is configured execute the computer program to perform the method described above.

To solve the above technical problems, the computer-readable storage medium stores a computer program. The computer program, when being executed by a processor, causes the processor to perform the method described above.

In the method according to the present disclosure, parallel control for a current source and a voltage source is established, and a voltage across an alternating-current bus is acquired. When the voltage is lower than a first threshold, the current source is controlled to output a current to increase the voltage across the alternating-current bus. Then, it is determined whether the voltage exceeds a second threshold. In a case that the voltage exceeds the second threshold, the current source is controlled to stop outputting the current. In a case that the voltage does not exceed the second threshold, power is distributed between the current source and the voltage source after power synchronization. Therefore, according to the present disclosure, the current is outputted when the voltage across the alternating-current bus is greater than the first threshold, instead of calculating the power. Further, the current source is directly controlled to output the current, and therefore unnecessarily wait for the power from the voltage source. In this way, the current source can output the current fast, that is, the current source can respond fast. In addition, the voltage across the bus is monitored in real time, thereby avoiding damage to the voltage source.

Furthermore, the device and the computer-readable storage medium according to the present disclosure can achieve the same beneficial effects as described above.

BRIEF DESCRIPTION OF THE DRAWINGS

In order to clearly illustrate the embodiments of the present disclosure, the drawings used in the description of the embodiments are briefly described below. It is apparent that the drawings in the following description show only some embodiments of the present disclosure, and other drawings may be obtained by those skilled in the art based on the drawings without any creative efforts.

DETAILED DESCRIPTION OF THE EMBODIMENTS

Hereinafter, the technical solutions in the embodiments of the present disclosure are described clearly and completely with reference to the drawings in the embodiments of the present disclosure. It is apparent that the embodiments described are only some rather than all of the embodiments of the present disclosure. Any other embodiments obtained by those skilled in the art based on the embodiments in the present disclosure without any creative work fall into the protection scope of the present disclosure.

According to the present disclosure, a method and a device for a current source to respond, and a computer-readable storage medium are provided.

The present disclosure is described in detail below with reference to the drawings and in conjunction with the embodiments. Therefore, those skilled in the art can better understand the solutions according to the present disclosure.

Figure 1:
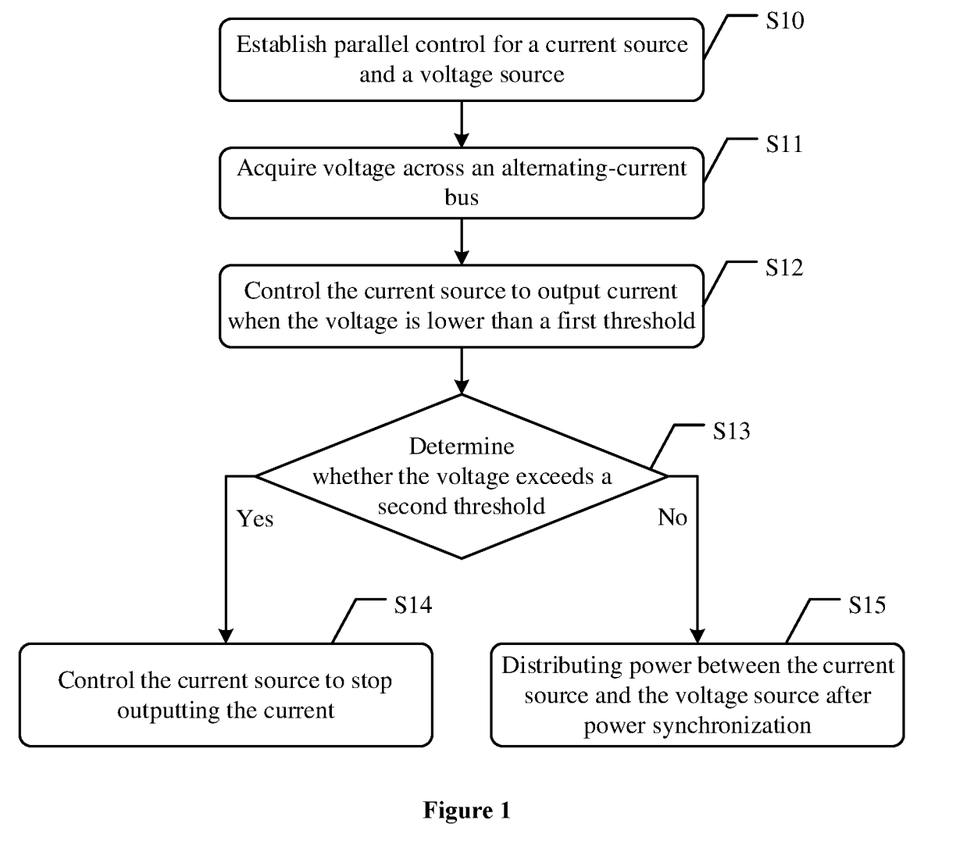
FIG. 1 is a flowchart illustrating a method for a current source to respond according to an embodiment of the present disclosure.

FIG. 1 is a flowchart of a method for a current source to respond according to an embodiment of the present disclosure. As shown in FIG. 1, the method includes the following steps S10 to S15.

In step S10, parallel control for the current source and a voltage source is established.

In step S11, a voltage across an alternating-current bus is acquired.

In step S12, when the voltage is lower than a first threshold, the current source is controlled to output a current.

In step S13, it is determined whether the voltage exceeds a second threshold. In a case that the voltage exceeds the second threshold, step S14 is performed. In a case that the voltage does not exceed the second threshold, step S15 is performed.

In step S14, the current source is controlled to stop outputting the current.

In step S15, power is distributed between the current source and the voltage source after power synchronization.

It should be understood that for renewables, e.g., solar energy, wind energy, inverters convert generated direct-current power into alternating-current power. Off-grid inverters are used in places where the power grid cannot reach. The off-grid inverters generally function as voltage sources, and therefore are stand-alone inverters. Multiple off-grid inverters operate in parallel to form a system of large and variable capacity. In a conventional master-slave system, an on-grid slave inverter performs power regulation though loop power control or loop current control. The master inverter transmits the calculated power to the slave inverter through a communication line. The slave inverter regulates its output current through loop power control, for evenly distributing power. However, in the process of distributing power, the slave inverter is relatively slow to respond, exerting great pressure on the master inverter. This may damage the master inverter. In view of this, the method for the current source to respond is proposed.

Figure 2:
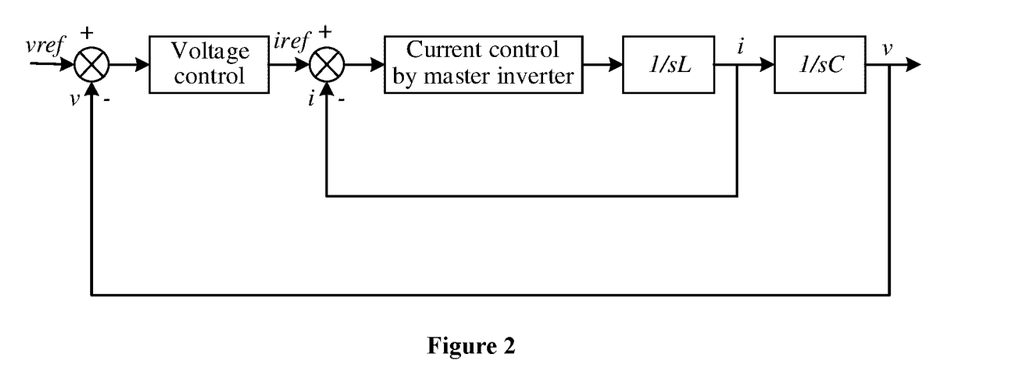
FIG. 2 is a block diagram illustrating control on a voltage source according to an embodiment of the present disclosure.
Figure 3:
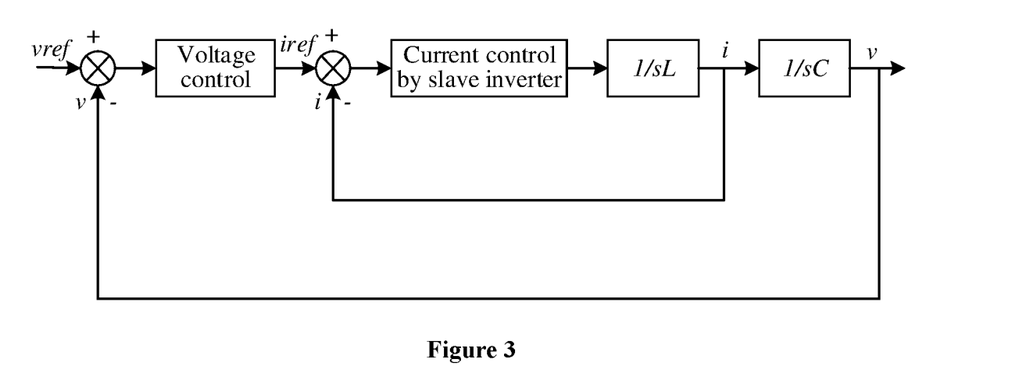
FIG. 3 is a block diagram illustrating control on the current source according to an embodiment of the present disclosure.

As described in step S10, parallel control for a current source and a voltage source is established. FIG. 2 is a block diagram illustrating control on the voltage source according to an embodiment of the present disclosure. As shown in FIG. 2 in which the voltage source serves as the master, vref represents a reference voltage, that is, an alternating-current voltage, and iref represents a reference current. The voltage source, i.e., the master performs closed-loop voltage control based on an outputted off-grid voltage v and the reference voltage vref to obtain the reference current iref, and then performs current control to obtain its output current. FIG. 3 is a block diagram control on the current source according to an embodiment of the present disclosure. As shown in FIG. 3 in which the current source serves as the slave, vref represents a reference voltage, and iref represents a reference current. The current source, i.e., the slave samples the voltage v across alternating-current bus, and performs closed-loop voltage control based on the sampled voltage v and the reference voltage vref to obtain iref, and then performs current control to obtain its output current. The voltage source performs both closed-loop voltage control and closed-loop current control, and the current source performs both closed-loop voltage control and closed-loop current control under frequency locking. In case of an increase in power, the voltage source may output decreased voltage due to a steady-state error resulted from the hysteresis in the closed-loop control for sinusoidal quantities. When detecting the decrease in the voltage, the current source outputs the current to compensate for the decrease in the voltage. As shown in the Figures, vref represents the alternating-current reference voltage, iref represents the reference current. Closed-loop voltage control is performed based on the voltage v across the alternating-current bus which is obtained by an acquisition unit and vref to obtain the reference current iref. Closed-loop current control is performed based on the reference current iref and the current I outputted by the current source which is acquired by an acquisition unit.

There is a steady-state error between the outputted voltage and the voltage across the alternating-current bus acquired in step S11, resulting in the decrease in the voltage. The current source being controlled to output the current when the voltage is lower than the first threshold in step S12 is the compensation performed by the current source described above. In addition, the first threshold is not limited in the embodiments, but depends on actual applications.

In step S13, it is determined whether the voltage exceeds the second threshold. It should be understood that after the current source performs the compensation, it is determined whether the voltage falls into a safe range. In a case that the voltage exceeds the second threshold, it indicates that excessive compensation is performed, and the current source is controlled to stop outputting the current. In a case that the voltage does not exceed the second threshold, power is distributed between the current source and the voltage source after power synchronization by the voltage source. It should be noted that in the embodiments of the present disclosure, how to distribute power is not limited. The power may be evenly distributed, or more power is distributed to the voltage source, or the power may be distributed based on the battery power corresponding to the voltage source and the battery power corresponding to the current source, depending on specific implementations. In addition, the second threshold is not limited herein as long as the second threshold is larger than the first threshold, and the second threshold may be determined according to specific implementations.

In the method according to the present disclosure, parallel control for a current source and a voltage source is established, and a voltage across an alternating-current bus is acquired. When the voltage is lower than a first threshold, the current source is controlled to output a current to increase the voltage across the alternating-current bus. Then, it is determined whether the voltage exceeds a second threshold. In a case that the voltage exceeds the second threshold, the current source is controlled to stop outputting the current. In a case that the voltage does not exceed the second threshold, power is distributed between the current source and the voltage source after power synchronization. Therefore, according to the present disclosure, the current is outputted when the voltage across the alternating-current bus is greater than the first threshold, instead of calculating the power. Further, the current source is directly controlled to output the current, and therefore unnecessarily wait for the power from the voltage source. In this way, the current source can output the current fast, that is, the current source can respond fast. In addition, the voltage across the bus is monitored in real time, thereby avoiding damage to the voltage source.

Based on the above embodiments, how to distribute power between the current source and the voltage source is described. The power is evenly distributed between the current source and the voltage source or is distributed between the current source and the voltage source based on remaining battery corresponding to the current source and remaining battery corresponding to the voltage source.

The power is evenly distributed between the current source and the voltage source as follows. For example, one voltage source and nine current sources are arranged and 1000 W is provided, then the power is divided into ten equal parts. The voltage source is allocated 100 W, and each of the current sources is allocated 100 W. However, the remaining battery corresponding to the voltage source may be different form the remaining battery corresponding to current source, the power being evenly distributed between the current source and the voltage source may be inappropriate for this case. Therefore, the power may be distributed proportionately based on the remaining battery corresponding to the current source and the remaining battery corresponding to the voltage source. For example, one voltage source and five current sources are arranged and 1000 w is provided, the remaining battery corresponding to the first current source is 20%, the remaining battery corresponding to the second current source is 25%, the remaining battery corresponding to each of the other three current sources is 10%, and the remaining battery corresponding to the voltage source is 25%. The voltage source is allocated 250 W, the first current source is allocated 200 W, the second current source is allocated 250 W, and each of the other current sources is allocated 100 W. In this way, both the voltage source and current source can work properly after the power distribution.

It should be noted that the power is preferably distributed as described above, and how the power is distributed is not limited to the above embodiment but depends on specific implementations.

In the embodiments, the power is equally distributed between the current source and the voltage source or the power is distributed based on the remaining battery corresponding to the current source and the remaining battery corresponding to the voltage source. Therefore, the power can be distributed fairly and then the current source or the voltage source can work properly after the power distribution, thereby improving the operation efficiency of the device.

Figure 4:
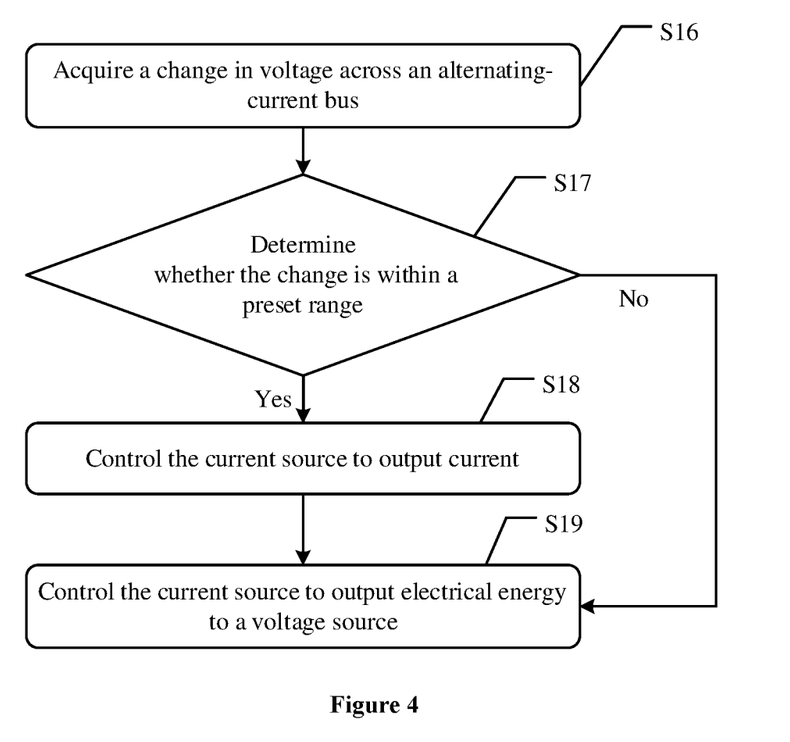
FIG. 4 is a flowchart illustrating a solution for the current source to respond to a sudden decrease in power according to an embodiment of the present disclosure.

In an embodiment, the power may suffer a sudden decrease. That is, the power may suddenly decrease. When the power suddenly decreases while the power of the voltage source remains unchanged, the power of the voltage source is excessively high, and the power of the load is excessively low. In this case, the power of the voltage source cannot be fully consumed by the load, resulting in damage to the voltage source. In view of this, a solution to the sudden decrease in power is provided according to an embodiment of the present disclosure. FIG. 4 is a flowchart illustrating the solution for the current source to respond to a sudden decrease in power according to an embodiment of the present disclosure. As shown in FIG. 4, the solution for the current source to respond to a sudden decrease in power includes the following steps S16 to S19.

In step S16, a change in the voltage across the alternating-current bus is acquired.

In step S17, it is determined whether the change is within a preset range. In a case that the change is within the preset range, step S18 is performed. In a case that the change is not within the preset range, step S19 is performed.

In step S18, the current source is controlled to output the current.

In step S19, the current source is controlled to output electrical energy to the voltage source.

It should be understood that when the power is suffering a sudden decrease, that is, when the power suddenly decreases while the power of the voltage source remains unchanged, the power of the voltage source is excessively high, and the power of the load is excessively low. In this case, the power of the voltage source cannot be fully consumed by the load, resulting in damage to the voltage source. In view of this, the solution to the sudden decrease in power is provided. As described in the steps S16 and S17, the change in the voltage across the alternating-current bus is obtained, and it is determined whether the change is within the preset range. The preset range is not limited in the embodiments of the present disclosure, but depends on specific implementations.

In addition, in a case that the change is within the preset range, it indicates that the current situation is still controllable. The current source is controlled to output the current to increase the voltage across the voltage source, and then output electrical energy to the voltage source. The voltage source receives the electrical energy outputted from the current source, and outputs the electrical energy to a battery. That is, when the load power suddenly decreases, the power of the voltage source is excessively high, so that the voltage source outputs the electrical energy to the battery, thereby realizing balance. In a case that the change is not within the preset range, it indicates that the current situation is un controllable. The step S19 is performed directly. The current source directly outputs electrical energy to the voltage source. After receiving the electrical energy, the voltage source outputs the electrical energy to the battery, thereby realizing balance.

In the embodiment, the solution to the sudden decrease in power is provided. The change in the voltage across the alternating-current bus is acquired, and it is determined whether the change is within the preset range. In a case that the change is within the preset range, the current source is controlled to output the current. In a case that the change is not within the preset range, the voltage source receives the electrical energy from the current source, and outputs the electrical energy to the battery. With the solution according to the embodiment, electrical energy is outputted to the voltage source, and thence to the battery, realizing power balance, resulting in less impact on the voltage source in case of the sudden decrease in power, and improving the stability of the device.

In a preferred embodiment, a state of the voltage source and a state of the current source are monitored to determine whether the voltage source and the current source malfunction, thereby facilitating timely countermeasures to the malfunction.

In the above embodiments, the method for a current source to respond is described in detail. A device for a current source to respond is further provided according to the embodiments of the present disclosure. It should be noted that according to the present disclosure, the device is described in terms of function modules and hardware.

Figure 5:
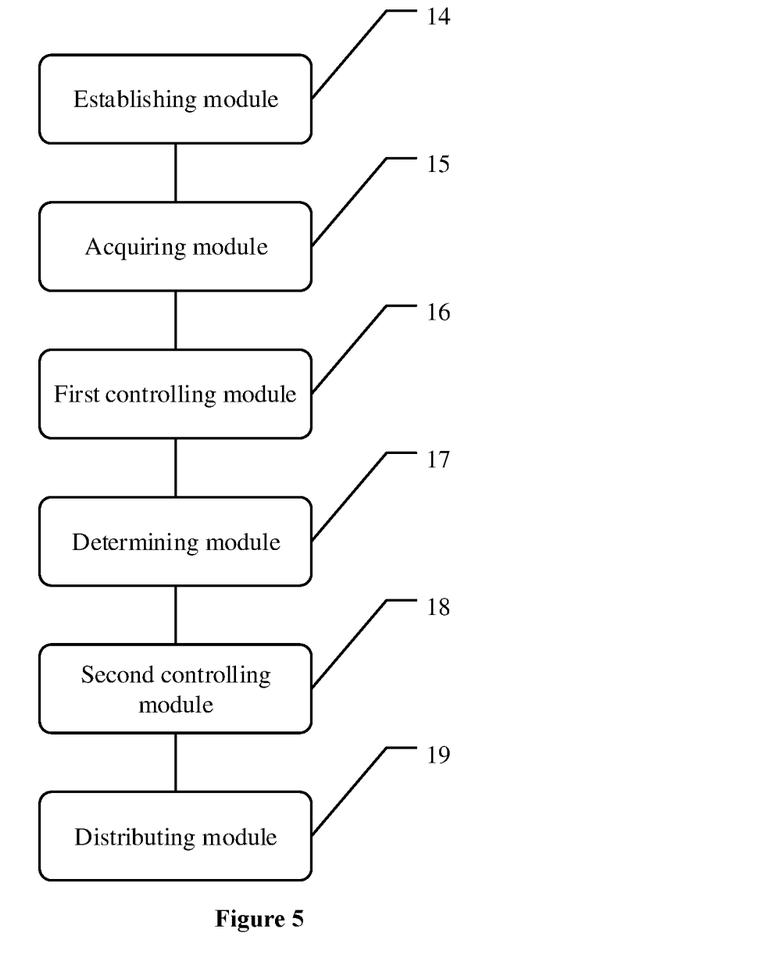
FIG. 5 is a schematic structural diagram illustrating a device for the current source to respond according to an embodiment of the present disclosure.

FIG. 5 is a schematic structural diagram illustrating the device according to an embodiment of the present disclosure. As shown in FIG. 5, the device includes an establishing module 14, an acquiring module 15, a first controlling module 16, a determining module 17, a second controlling module 18, and a distributing module 19.

The establishing module 14 is configured to establish parallel control for the current source and a voltage source.

The acquiring module 15 is configured to acquire voltage across an alternating-current bus.

The first controlling module 16 is configured to control the current source to output a current when the voltage is lower than a first threshold.

The determining module 17 is configured to: determine whether the voltage exceeds a second threshold, where the second threshold is greater than the first threshold; trigger the second controlling module in a case that the voltage exceeds the second threshold; and trigger the distribution module in a case that the voltage does not exceed the second threshold.

The second controlling module 18 is configured to control the current source to stop outputting the current.

The distribution module 19 is configured to distributing power between the current source and the voltage source after power synchronization.

The device according to the embodiment of the present disclosure includes: an establishing module, an acquiring module, a first controlling module, a determining module, a second controlling module, and a distributing module. The device is configured to perform the method for a current source to respond. According to the device, parallel control for a current source and a voltage source is established, and a voltage across an alternating-current bus is acquired. When the voltage is lower than a first threshold, the current source is controlled to output a current to increase the voltage across the alternating-current bus. Then, it is determined whether the voltage exceeds a second threshold. In a case that the voltage exceeds the second threshold, the current source is controlled to stop outputting the current. In a case that the voltage does not exceed the second threshold, power is distributed between the current source and the voltage source after power synchronization. Therefore, according to the present disclosure, the current is outputted when the voltage across the alternating-current bus is greater than the first threshold, instead of calculating the power. Further, the current source is directly controlled to output the current, and therefore unnecessarily wait for the power from the voltage source. In this way, the current source can output the current fast, that is, the current source can respond fast. In addition, the voltage across the bus is monitored in real time, thereby avoiding damage to the voltage source.

Figure 6:
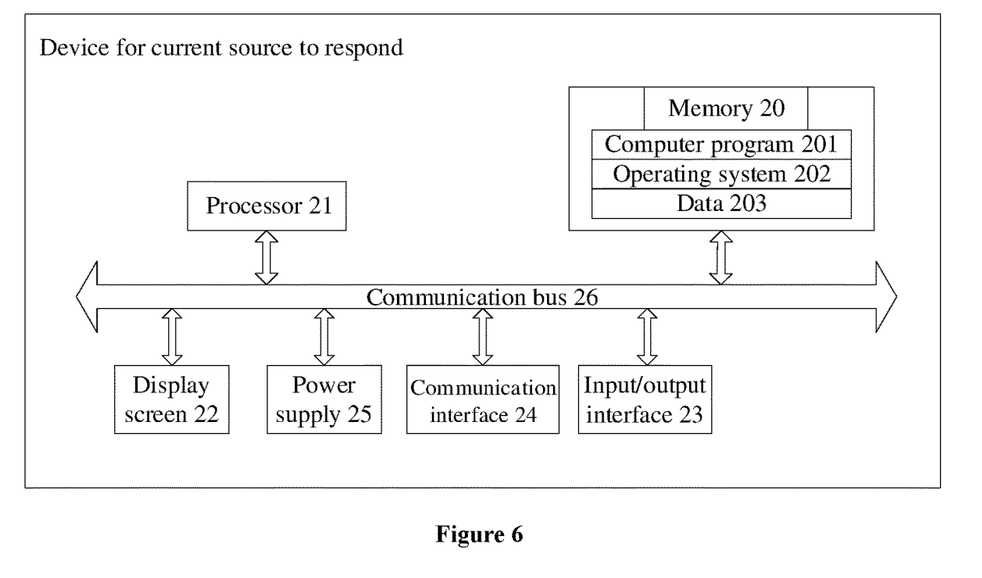
FIG. 6 is a schematic structural diagram illustrating the device according to another embodiment of the present disclosure.

FIG. 6 is a schematic structural diagram illustrating the device according to another embodiment of the present disclosure. As shown in FIG. 6, the device includes: a memory 20 and a processor 21. The memory 20 stores a computer program. The processor 21 is configured to execute the computer program to perform the method for the current source to respond as described above.

The device according to the embodiment of the present disclosure may include, but is not limited to, smartphones, tablets, laptops, desktop computers, or the like.

The processor 21 may include one or more processing cores, such as a quad-core processor and an octa-core processor. The processor 21 may be implemented by at least one of the following hardware forms, including DSP (Digital Signal Processing), FPGA (Field-Programmable Gate Array), and PLA (Programmable Logic Array). The processor 21 may include a main processor and a coprocessor. The main processor, also referred as a Central Processing Unit (CPU), is configured to process data in a wake-up state. The coprocessor is a low-power processor for processing data in a standby mode. In some embodiments, the processor 21 may be integrated with a GPU (Graphics Processing Unit) for rendering and drawing content to be displayed on a display screen. In some embodiments, the processor 21 may further include an AI (Artificial Intelligence) processor for processing computational operations related to machine learning.

The memory 20 may include one or more computer-readable storage media, which may be non-transient. The memory 20 may include a high-speed random access memory and a non-volatile memory, for example, one or more disk storage devices and flash storage devices. In the embodiment, the memory 20 at least stores a computer program 201. The computer program, being loaded and executed by the processor 21, causes the processor 21 to perform the method for a current source to respond described in the above embodiments. In addition, the resources stored in the memory 20 may include an operating system 202 and data 203, which may be temporarily or permanently stored. The operating system 202 may include Windows, Unix, Linux, and the like. The data 203 may include but is not limited to data related to the method for a current source to respond.

In some embodiments, the device may further include a display screen 22, an input/output interface 23, a communication interface 24, a power supply 25, and a communication bus 26.

It should be understood by those skilled in the art that, the structure of the device is not limited to that as shown in FIG. 6. Instead, the device may include more or fewer components than the components shown in FIG. 6.

The device according to the embodiment of the present disclosure includes: a memory and a processor. The memory stores a computer program. The processor is configured to execute the computer program, to perform the method for a current source to respond described above. According to the device, parallel control for a current source and a voltage source is established, and a voltage across an alternating-current bus is acquired. When the voltage is lower than a first threshold, the current source is controlled to output a current to increase the voltage across the alternating-current bus. Then, it is determined whether the voltage exceeds a second threshold. In a case that the voltage exceeds the second threshold, the current source is controlled to stop outputting the current. In a case that the voltage does not exceed the second threshold, power is distributed between the current source and the voltage source after power synchronization. Therefore, according to the present disclosure, the current is outputted when the voltage across the alternating-current bus is greater than the first threshold, instead of calculating the power. Further, the current source is directly controlled to output the current, and therefore unnecessarily wait for the power from the voltage source. In this way, the current source can output the current fast, that is, the current source can respond fast. In addition, the voltage across the bus is monitored in real time, thereby avoiding damage to the voltage source.

A computer-readable storage medium is further provided according to an embodiment of the present disclosure. The computer-readable storage medium stores a computer program. The computer program, when being executed by a processor, causes the processor to perform the method for a current source to respond as described above.

It should be understood that if the method in the above embodiments is implemented in a form of software and is sold or used as an independent product, the software may be stored in a computer-readable storage medium. Based on the above understanding, the technical solutions according to the present disclosure, in essence or the port of the technical solutions contributing to the conventional technology or all or part of the technical solutions, may be provided in a form of a software product. The computer software product is stored in a storage medium and performs all or part of the steps of the method described in the embodiments of the present disclosure. The storage medium includes: USB flash drives, portable hard drives, read-only memories (ROM), random access memories (RAM), disks, CDs, and other mediums that may store program codes.

The computer-readable storage medium according to the embodiment of the present disclosure stores a computer program. The computer program, when being executed by a processor, causes the processor to perform the method for a current source to respond described above. According to device, parallel control for a current source and a voltage source is established, and a voltage across an alternating-current bus is acquired. When the voltage is lower than a first threshold, the current source is controlled to output a current to increase the voltage across the alternating-current bus. Then, it is determined whether the voltage exceeds a second threshold. In a case that the voltage exceeds the second threshold, the current source is controlled to stop outputting the current. In a case that the voltage does not exceed the second threshold, power is distributed between the current source and the voltage source after power synchronization. Therefore, according to the present disclosure, the current is outputted when the voltage across the alternating-current bus is greater than the first threshold, instead of calculating the power. Further, the current source is directly controlled to output the current, and therefore unnecessarily wait for the power from the voltage source. In this way, the current source can output the current fast, that is, the current source can respond fast. In addition, the voltage across the bus is monitored in real time, thereby avoiding damage to the voltage source.

Hereinabove, the method and the device for a current source to respond, and the computer-readable storage medium according to the present disclosure are described in detail. The embodiments in this specification are described in a progressive manner. Each of the embodiments focuses on differences with other embodiments, and the same or similar parts of the embodiments may be with reference to each other. Description of the device disclosed in the embodiments is simplified, since the device corresponds to the method disclosed in the embodiments, reference may be made to the description of the method for related explanations. It should be noted that although those skilled in the art may make improvements and modifications on the present disclosure without departing from the spirit of the present disclosure, the improvements and modifications should fall within the scope of the claims of the present disclosure.

It should be further noted that the relationship terms herein such as "first", "second" and the like are only used to distinguish one entity or operation from another, rather than necessitate or imply that any such actual relationship or order exists between these entities or operations. Moreover, the terms "comprise", "include", or any other variants thereof are intended to encompass a non-exclusive inclusion, such that the process, method, article, or device including a series of elements includes not only those elements but also those elements that are not explicitly listed, or the elements that are inherent to such process, method, article, or device. Unless explicitly limited, the statement "including a . . . " does not exclude the case that other similar elements may exist in the process, method, article or device other than enumerated elements.

The invention claimed is:

1. A method for a current source to respond, comprising:
   establishing parallel control for the current source and a voltage source;
   acquiring a voltage across an alternating-current bus;
   controlling the current source to output a current when the voltage is lower than a first threshold;
   determining whether the voltage exceeds a second threshold, wherein the second threshold is greater than the first threshold;
   controlling the current source to stop outputting the current, when the voltage exceeds the second threshold; and
   distributing power between the current source and the voltage source after power synchronization, when the voltage does not exceed the second threshold.

2. The method according to claim 1, wherein the distributing power between the current source and the voltage source comprises:
   evenly distributing the power between the current source and the voltage source; or distributing the power between the current source and the voltage source based on remaining battery corresponding to the current source and remaining battery corresponding to the voltage source.

3. The method according to claim 1, further comprising:
in response to a sudden decrease in the power,
acquiring a change in the voltage across the alternating-current bus;
determining whether the change is within a preset range;
controlling the current source to output the current when the change is within the preset range; and
controlling the current source to output electrical energy to the voltage source for the voltage source to output the electrical energy to a battery.

4. The method according to claim 3, wherein
the controlling the current source to output electrical energy to the voltage source for the voltage source to output the electrical energy to a battery is performed when the change is not within the preset range.

5. The method according to claim 1, further comprising:
monitoring a state of the voltage source and a state of the current source.

6. A device for a current source to respond, comprising:
an establishing module;
an acquiring module;
a first controlling module;
a determining module;
a second controlling module; and
a distributing module, wherein
the establishing module is configured to establish parallel control for the current source and a voltage source;
the acquiring module is configured to acquire a voltage across an alternating-current bus;
the first controlling module is configured to control the current source to output a current when the voltage is lower than a first threshold;
the determining module is configured to: determine whether the voltage exceeds a second threshold, wherein the second threshold is greater than the first threshold; trigger the second controlling module when the voltage exceeds the second threshold; and trigger the distribution module when the voltage does not exceed the second threshold;
the second controlling module is configured to control the current source to stop outputting the current; and
the distributing module is configured to distribute power between the current source and the voltage source after power synchronization.

7. A device for a current source to respond, comprising:
a memory storing a computer program; and
a processor configured to execute the computer program to
establish parallel control for the current source and a voltage source;
acquire a voltage across an alternating-current bus;
control the current source to output a current when the voltage is lower than a first threshold;
determine whether the voltage exceeds a second threshold, wherein the second threshold is greater than the first threshold;
control the current source to stop outputting the current, when the voltage exceeds the second threshold; and
distribute power between the current source and the voltage source after power synchronization, when the voltage does not exceed the second threshold.

8. A computer-readable storage medium, storing a computer program, wherein the computer program, when being executed by a processor, causes the processor to perform the method according to claim 1.

9. The method according to claim 2, further comprising:
monitoring a state of the voltage source and a state of the current source.

10. The method according to claim 3, further comprising:
monitoring a state of the voltage source and a state of the current source.

11. The method according to claim 4, further comprising:
monitoring a state of the voltage source and a state of the current source.

* * * * *